Patented Oct. 26, 1926.

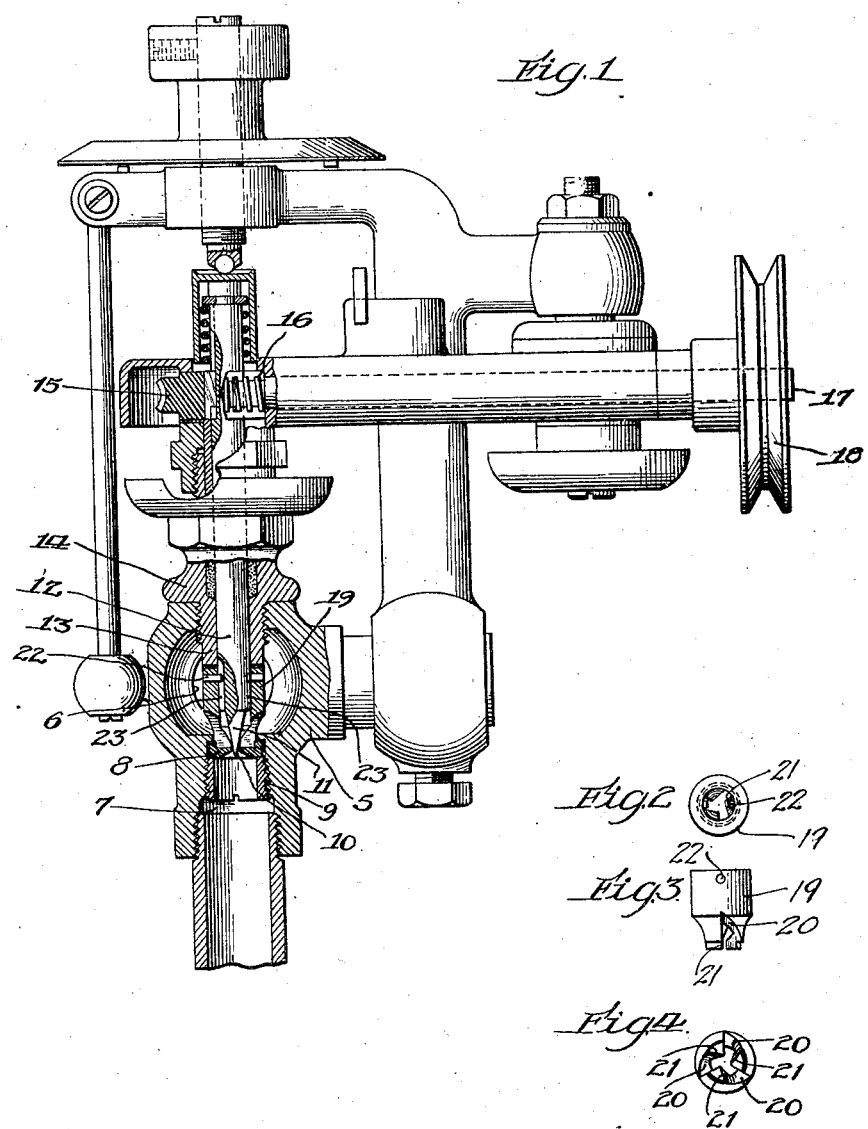

1,604,776

UNITED STATES PATENT OFFICE.

FRANKLIN HARDINGE, OF CHICAGO, ILLINOIS, ASSIGNOR TO HARDINGE BROTHERS, INC., OF CHICAGO, ILLINOIS, A CORPORATION OF ILLINOIS.

VALVE.

Application filed December 2, 1921. Serial No. 519,322.

My invention relates to improvements in valves, and is particularly concerned with the provision of a valve for controlling fluids flowing at a comparatively slow rate.

The objects of my invention are—

First, to provide a valve of the character described which is so constructed that the flow of fluid can be restricted to a very slow rate;

Second, to provide a valve of the character described which is not likely to become clogged by dirt or other impurities, or sediment carried by the fluids passing through the valve;

Third, to provide a valve in which the above mentioned result is accomplished by means of a member which automatically cleans one of the coacting valve members;

Fourth, to provide a valve such as described in which a cleaning element is provided which comprises a scraper member which can be actuated to prevent the deposit of dirt or other impurities upon one of the coacting valve members;

Fifth, to provide a valve comprising a rotary needle, and means driven from the needle which urges any dirt or sediment, tending to collect upon the valve seat, toward the opening in the valve, and Finally, to provide a valve of the character described which is simple in construction and economical to manufacture.

Other objects will appear as this description progresses, reference being had to the accompanying drawings wherein I have shown my approved valve construction in connection with a rotary valve of the type described and claimed in my Patent No. 1,470,974, issued October 16, 1923.

Figure 1 is a side elevation, partially in central longitudinal section, showing certain details of construction of my improved valve, parts of the drawing being broken away for the purpose of better illustration;

Figure 2 is an end view of one end of the cleaning element of my improved valve;

Figure 3 is a side elevation thereof, and

Figure 4 is an end elevation of the opposite end of the cleaning element.

Throughout the several views, similar reference characters will be used for referring to similar parts.

In my patent referred to above, I have disclosed a valve which comprises in general a body member 5 having an inlet bore 6 and an outlet bore 7 between which a disc-shaped member 8 is secured by means of the threaded sleeve 9, the disc having a small opening 10 formed therein. This disc acts as a valve seat. It will be noted from an inspection of the drawing that the disc is of slightly smaller diameter than the bore in which it is clamped so that it can be adjusted to bring it in alignment with the tapered end 11 of the needle 12, and that its upper side is recessed as shown at 8'.

The needle 12 is rotatably mounted in a bearing 13 forming a part of the plug 14 which screws into the body member 5, as shown in Figure 1, and a worm gear 15 is splined to the upper end of the needle 12 so that the needle 12 may be adjusted longitudinally. The worm gear 15 is driven by a worm 16 on the end of a shaft 17, which may be driven by a belt coacting with the grooved pulley 18. I provide means for adjusting the needle 12 longitudinally, but since these means are fully illustrated and described in my aforesaid patent, I will not describe them in detail herein.

Having thus described in a general way certain portions of the construction claimed in my aforesaid patent, I will now describe the improved feature of my invention.

Slidably mounted upon the lower end of the needle 12 is a sleeve 19, the lower end of which is tapered, and in which a plurality of radially extending slots 20 have been cut to form on the lower end of the sleeve scraper edges 21 which are so inclined that when the sleeve is rotated in a counter-clockwise direction (Fig. 4), the scraper edges will direct any small particles of dirt, sediment, or other impurities toward and into the opening 10 of the valve seat. The slots 20 provide passageways through which the fluid may pass on its way through the valve. The lower end of the sleeve 19 is reduced in diameter to fit in the recess in the upper side of the disc 8. In this manner, the lower end of the sleeve is properly centered relatively to the needle.

The sleeve 19 is splined to the needle 12 by means of the pins 22, the inner ends of which project into longitudinally extending slots 23 formed in the needle 12. These slot and pin connections between the sleeve 19 and the needle 12 not only provide a driving connection for the sleeve 19, but also permit the needle 12 to be adjusted longitudinally so as to regulate the flow through the valve as desired.

From the above description, it will be noted that the cross section of the tapered end 11 of the needle decreases toward the outlet bore of the valve, which tends to prevent the packing of dirt or sediment between the needle and its seat which might otherwise occur if the bore 7 were made the inlet bore. It will also be noted that the cleaning device is located on the inlet side of the valve seat.

The valve which I have described above is particularly suited for the control of the flow of fuel to an oil burner where it is desired to burn the oil at a comparatively slow rate, say from one-fourth to one-half gallons per hour, because practically all fuel oils, and even lighter distillates, contain fine dirt and other impurities which would quickly clog an orifice which would be small enough to deliver oil at the above mentioned rate if some means were not provided to avoid such clogging.

It is to be clearly understood, however, that my invention is in no way limited to the details of construction specified above, and that while I have described the details of construction of the preferred embodiment of my invention, it is not to be limited to these details, but is capable of other adaptations and modifications within the scope of the appended claims.

Having thus described my invention, what I claim is:

1. A valve comprising a body member provided with inlet and outlet bores, a disc mounted between said inlet and outlet bores and having an opening therethrough, a needle adjustably mounted in said body member to be moved in and out of said opening, means for rotating said needle without disturbing its adjustment, and a sleeve surrounding said needle adjacent the inner end thereof and splined to said needle, one end of said sleeve resting upon said disc and having a slot cut therein, forming a scraper edge for cleaning the face of said disc and urging impurities towards said opening, and also forming the passageway for the fluid passing through said valve.

2. A valve comprising a body member provided with inlet and outlet bores, a disc mounted between said inlet and outlet bores and having an opening therethrough, a needle adjustably mounted to be moved in and out of said opening, means for rotating said needle without disturbing its adjustment, and a sleeve surrounding said needle adjacent the inner end thereof and splined to said needle, one end of said sleeve resting upon said disc and having a scraper edge for cleaning the face of said disc and urging impurities towards said opening.

3. A valve comprising a body member having inlet and outlet bores, a valve seat between said bores, said valve seat having an opening therethrough, a needle for coacting with said valve seat to control the flow of fluid through said opening, means for adjusting said needle to and from said seat, means for rotating said needle without disturbing its adjustment, and means driven by said rotating needle for scraping sediment from said seat and urging it toward said opening.

4. A valve comprising a body member having inlet and outlet bores, a valve seat between said bores, said valve seat having an opening therethrough, a needle for coating with said valve seat to control the flow of fluid through said opening, means for adjusting said needle to and from said seat, means for rotating said needle without disturbing its adjustment, and means for scraping sediment from said seat and urging it toward said opening.

5. A valve comprsing a body member having inlet and outlet bores, a valve seat between said bores, said valve seat having an opening therethrough, a needle for coacting with said valve seat to control the flow of fluid through said opening, means for adjusting said needle to and from said seat, and means for scraping sediment from said seat and urging it toward said opening.

6. A valve comprising means forming an anterior liquid chamber having a valve seat with an opening therethrough, a needle coacting with said seat to control the flow of fluid through said opening, means for rotating said needle without disturbing its adjustment, and means connected with the needle for cleaning the surface of the said valve seat surrounding said opening.

7. A valve comprising a body member having inlet and outlet bores, a valve seat between said bores forming an opening for the passage of fluid, a needle for coacting with said valve seat and decreasing in cross section from said inlet bore toward said outlet bore, and means located on the inlet side of said valve seat for urging sediment toward said opening.

In witness whereof, I hereunto subscribe by name this 10th day of November, 1921.

FRANKLIN HARDINGE.